United States Patent
Zhang et al.

(10) Patent No.: US 7,495,222 B2
(45) Date of Patent: Feb. 24, 2009

(54) SIGNAL POLARITY INVERTING MULTIPLEXING CIRCUITS FOR NUCLEAR MEDICAL DETECTORS

(75) Inventors: Nan Zhang, Knoxville, TN (US); Matthias J. Schmand, Lenoir City, TN (US); Niraj K. Doshi, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 18 days.

(21) Appl. No.: 11/751,372

(22) Filed: May 21, 2007

(65) Prior Publication Data

US 2008/0017803 A1    Jan. 24, 2008

Related U.S. Application Data

(60) Provisional application No. 60/801,904, filed on May 19, 2006.

(51) Int. Cl.
  *G01T 1/20*    (2006.01)
(52) U.S. Cl. .................................. 250/366
(58) Field of Classification Search ............ 250/369, 250/366
See application file for complete search history.

(56) References Cited

U.S. PATENT DOCUMENTS

| 4,531,058 | A | * | 7/1985 | Burnham et al. ....... 250/363.03 |
| 5,880,689 | A | * | 3/1999 | Kushner ..................... 341/144 |
| 2001/0040219 | A1 | * | 11/2001 | Cherry et al. .......... 250/363.03 |

OTHER PUBLICATIONS

N. Zhang et al., "Anode position and last dynode timing circuits for dual-layer BGO scintillator with PS-PMT based modular detector", Oct. 2002, IEEE Transactions on nuclear science, vol. 49, No. 5, , pp. 2203-2207.*

* cited by examiner

*Primary Examiner*—David P Porta
*Assistant Examiner*—Kiho Kim
(74) *Attorney, Agent, or Firm*—Peter L. Kendall

(57) ABSTRACT

A system for multiplexing photodetector signals from a scintillation detector. The system includes a detector module having a number of scintillator blocks, each scintillator block having a number of photosensors, and a number of multiplexing circuits. Each multiplexing circuit includes a number of inputs, a signal polarity inverter and at least one differential output attached to the signal polarity inverter. The multiplexing system inverts the polarity of preselected signals from the photosensors and selectively combines signals of different polarities to calculate event positioning and total energy.

14 Claims, 5 Drawing Sheets

SIGNAL POLARITY INVERTING MULTIPLEXING CIRCUITS FOR NUCLEAR MEDICAL DETECTORS

CROSS-REFERENCE TO RELATED APPLICATION AND CLAIM FOR PRIORITY

This application claims priority under 35 U.S.C. § 119(e) from copending Provisional Application Ser. No. 60/801,904 filed May 19, 2006.

TECHNICAL FIELD

The current invention is in the field of processing circuits for nuclear medical imaging signals. Particularly, the invention relates to multiplexing circuits for transferring signals from scintillation (nuclear event) detectors to an image signal processor.

BACKGROUND OF THE INVENTION

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively. Examples of some common medical imaging types are nuclear medical (NM) imaging such as positron emission tomography (PET) and single photon emission computed tomography (SPECT), electron-beam X-ray computed tomography (CT), magnetic resonance imaging (MRI), and ultrasound (US). Using these or other imaging types and associated machines, an image or series of images may be captured. Other devices may then be used to process the image in some fashion. Finally, a doctor or technician may read the image in order to provide a diagnosis.

In traditional PET imaging, a patient is injected with a radioactive substance with a short decay time. As the substance undergoes positron emission decay, it emits positrons which, when they collide with electrons in the patient's tissue give off two gamma rays. The gamma rays emerge from the patient's body simultaneously at substantially opposite directions. A number of these gamma ray pairs eventually reach scintillation devices positioned in opposing locations around the patient. The scintillation devices often are configured as a ring of scintillation devices surrounding the patient. When each of the gamma rays of the pair interact with the scintillation devices, a burst of light is emitted and detected. The light is usually transmitted through a lightguide to a photodetector where the light photons are converted to an electrical signal. The electrical signals produced by the photodetector are then interpreted by a processor and accumulated, from which an image of the region of interest may be reconstructed.

Gamma-ray signals from a scintillator such as LSO (lutetium oxyorthosilicate) and BGO (bismuth germanate) have an intrinsic shape, the signals have a fast rising edge following a slow falling edge. The signals can be estimated as a function of:

$$V_0(t) \approx A_1 \times m_0 \times \left( \frac{1}{\tau_1} \times e^{-t/\tau_1} - \frac{1}{\tau_0} \times e^{-t/\tau_0} \right)$$

where the decay time-constant $\tau_0$ is determined by the scintillation crystal, and time-constant $\tau_1$ is mainly determined by the characteristics of the photosensor, the open-loop gain of the first amplifier in the front-end electronics, and the input capacitance ($A_1$ and $m_0$ are factors associated with the number of emitted photons from the crystal in response to excitation by a gamma ray and conversion to a voltage). When $\tau_0 >> \tau_1$ (which is the case for LSO and BGO crystals), $\tau_1$ dominates the rising edge of the signal pulse, and $\tau_0$ dominates the pulse falling edge. The Laplace transfer-function of the above equation is:

$$H(s) = \frac{A_1}{\tau_1} \times \frac{s}{\left(s + \frac{1}{\tau_0}\right) \times \left(s + \frac{1}{\tau_1}\right)}.$$

The falling edge of the scintillation signal is a first-order exponential decay function, so the shape of the signal is always unipolar; it is either positive or negative depending on the electronic readout circuits used.

"Multiplexing" as used in NM electronics refers to encoding of combinations of signals from different photodetectors or photodetector segments to determine the spatial location of a gamma event in the scintillator. See U.S. Pat. No. 3,011,057 to Anger, incorporated herein by reference in its entirety, in particular FIG. 2. Resistor network based multiplexing methods also have been invented and implemented in "Position-Sensitive PMT" (PS-PMT) and "Multi-Channel PMT" (MC-PMT) PET/PEM (Positron Emission Mammography) systems. These resistor networks process signals only from current sources, such as PS-PMT and MC-PMT anode outputs. Thus, such resistor-based networks cannot be implemented in voltage source detectors. For example, an Avalanche-Photo-Diode (APD) PET detector must have a charge-sensitive amplifier to amplify the APD output at the first stage. Naturally, subsequent amplifier outputs are voltage sources rather than current sources.

More importantly, the resistor network schemes have limited signal dynamic range. The "multiplexing" detector blocks will share one position histogram image. So histogram images and position lookup tables are actually not multiplexed event though the signal channels are. This mapping (or multiplexing) design could cause poorer crystal identification ability, ultimately leading to potential degradation of PET image resolution.

In a combination PET system such as MR/PET, the PET main electronics cannot be close to the MR scanner. Practically, they need to be located outside, in a MR RF-shielded room. In this case, longer signal transmission cables are needed to connect between the PET detectors and the main electronics. Cable shielding and grounding potential could become an issue.

Therefore, it is desired to have multiplexing design that can be implemented for both current and voltage detector sources, and wherein each block can have its own position histogram image and lookup table and the scintillation crystal can be better identified, so the nearby crystal elements have less crosstalk problems.

SUMMARY OF THE INVENTION

The present invention provides a multiplexing circuit for a nuclear imaging detector having a signal encoding arrangement that solves the problems noted above. The multiplexing circuit includes selective signal polarity inversion, whereby bipolar detector signals can be used instead of conventional unipolar signals.

Further provided is a multiplexing system that includes a detector module with a number of scintillator blocks, a number of photodiodes arranged on each scintillator block, and a number of multiplexing circuits in accordance with the invention, attached to one photodiode from each scintillator block. In one preferred embodiment, the multiplexing system uses RF transformers to implement signal polarity inversion.

Further provided is a method of calculating the position of a scintillation event. The method includes the steps of converting unipolar signals A, B, C and D from a scintillation detector to bipolar signals ±A, ±B, ±C, and ±D, respectively, transferring the bipolar signals to a processor, and calculating the energy E and position (X, Y) of the scintillation event based on the equations:

$$E=|A^+-A^-|+|B^+-B^-|+|C^+-C^-|+|D^+-D^-|$$

$$X=(|A^+-A^-|+|B^+-B^-|)/E$$

$$Y=(|A^+-A^-|+|C^+-C^-|)/E, \text{ where}$$

$$A=(A^+-A^-)=(-A_0)+(-A_1)+(+A_2)+(+A_3)$$

$$B=(B^+-B^-)=(-B_0)+(+B_1)+(-B_2)+(+B_3)$$

$$C=(C^+-C^-)=(-C_0)+(-C_1)+(+C_2)+(+C_3)$$

$$D=(D^+-D^-)=(-D_0)+(+D_1)+(-D_2)+(+D_3)$$

BRIEF DESCRIPTION OF THE DRAWINGS

The invention will now be described in greater detail in the following by way of example only and with reference to the attached drawings, in which.

DETAILED DESCRIPTION OF THE INVENTION

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
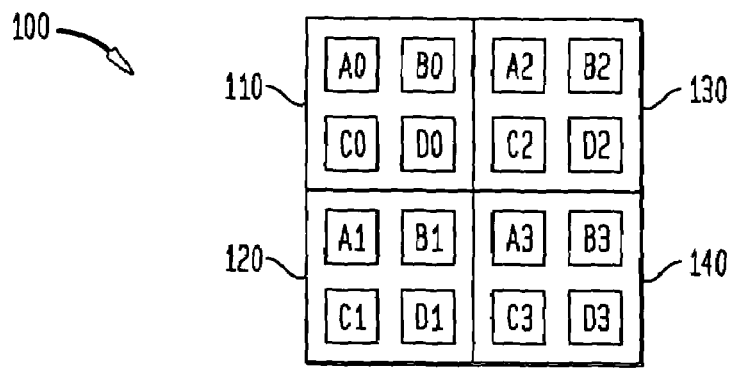
FIG. 1 depicts a known detector module based on the "block detector" design, which is applicable to the present invention.

FIG. 1 illustrates a known detector module 100 based on the "block detector" design. Module 100 consists of four optically isolated scintillator blocks, 110, 120, 130, and 140. Each block 110, 120, 130, and 140 contains four photosensors Ai–Di, i=0-3, which photosensors may be PMTs, APDs or equivalents.

Figure 2:
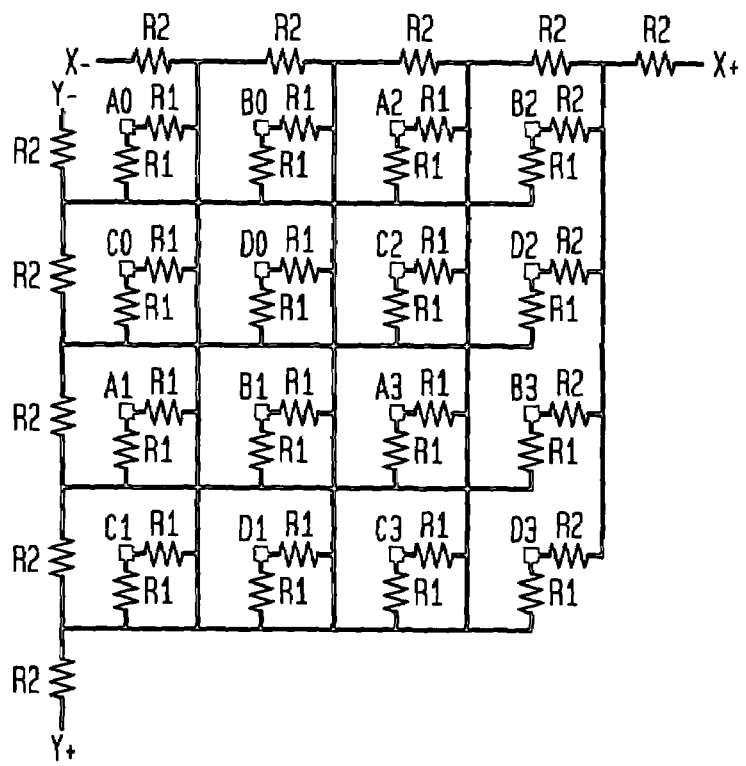
FIG. 2 depicts a known multiplexing circuit for PS-PMTs based on a resistor network.

FIG. 2 shows a conventional resistor network multiplexing circuit for a PS-PMT. The gamma-ray interaction positions from the circuit are decoded from:

$$X=(X^+-X^-)/E_X \quad (1)$$

$$Y=(Y^+-Y^-)/E_Y \quad (2)$$

$$E_X=X^++X^-, E_Y=Y^++Y^-, \text{ where } E_X \approx E_Y \quad (3)$$

Figure 3:
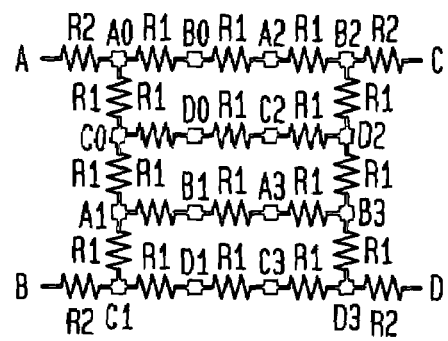
FIG. 3 depicts another known MC-PMT multiplexing circuit based on a resistor network.

FIG. 3 shows another conventional resistor network multiplexing circuit for a MC-PMT. The interactive positions from this circuit are calculated as:

$$X=(A+B)/E \quad (4)$$

$$Y=(A+C)/E \quad (5)$$

$$E=A+B+C+D \quad (6)$$

Even though many other resistor network multiplexing circuits have been investigated from many academic and industrial groups, they are generally variations of the circuits of FIG. 2 and FIG. 3.

Figure 4:
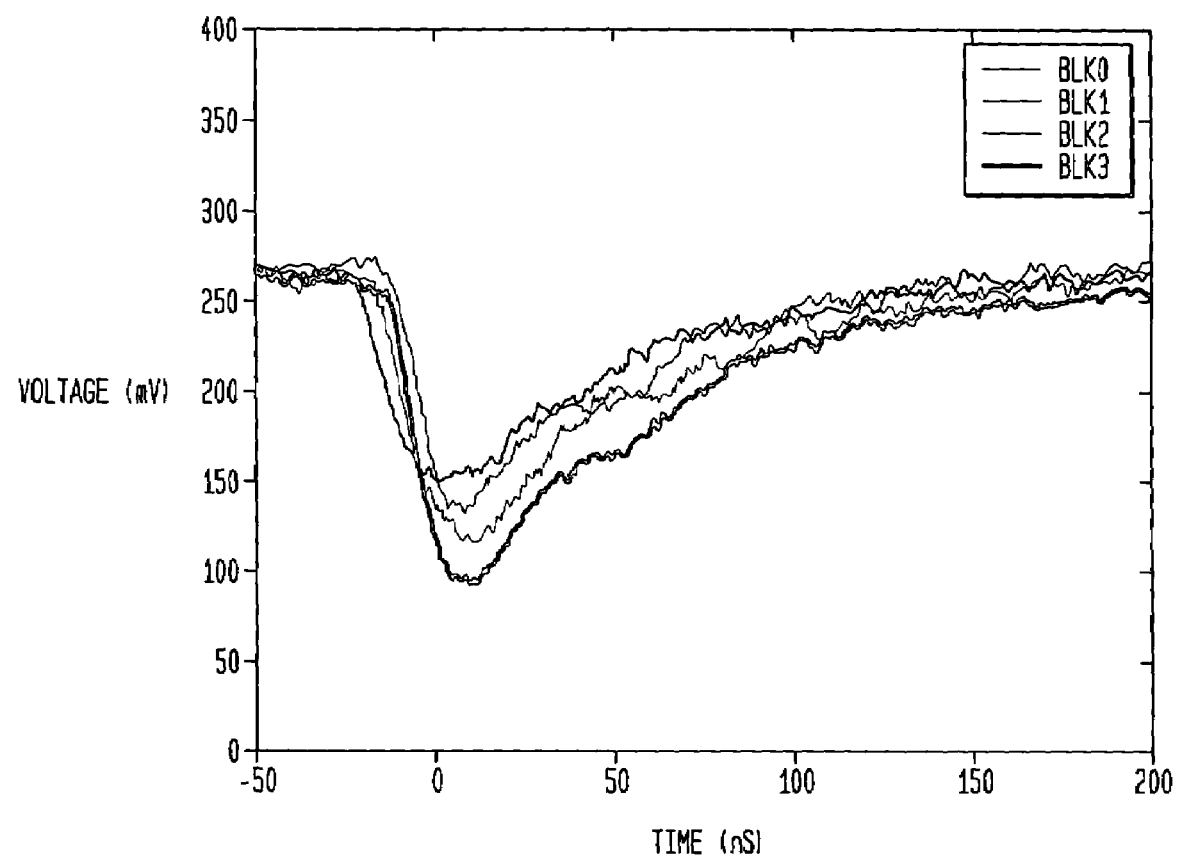
FIG. 4 is a graph illustrating signal waveforms from four channel outputs of an APD detector block.
Figure 5:
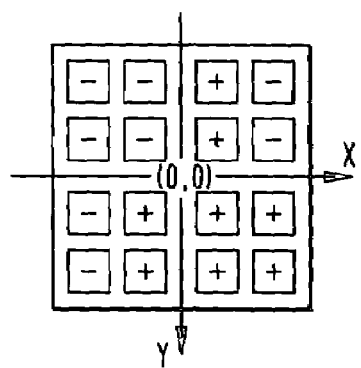
FIG. 5 shows a detector module polarity scheme in accordance with one aspect of the invention.

FIG. 4 shows signal waveforms for four channel outputs from one APD detector block. The waveforms have typical shapes showing the unipolar pulse characteristics. If certain channel polarities are inverted as shown in FIG. 5, then the polarity information may be used for multiplexing purposes.

Figure 6:
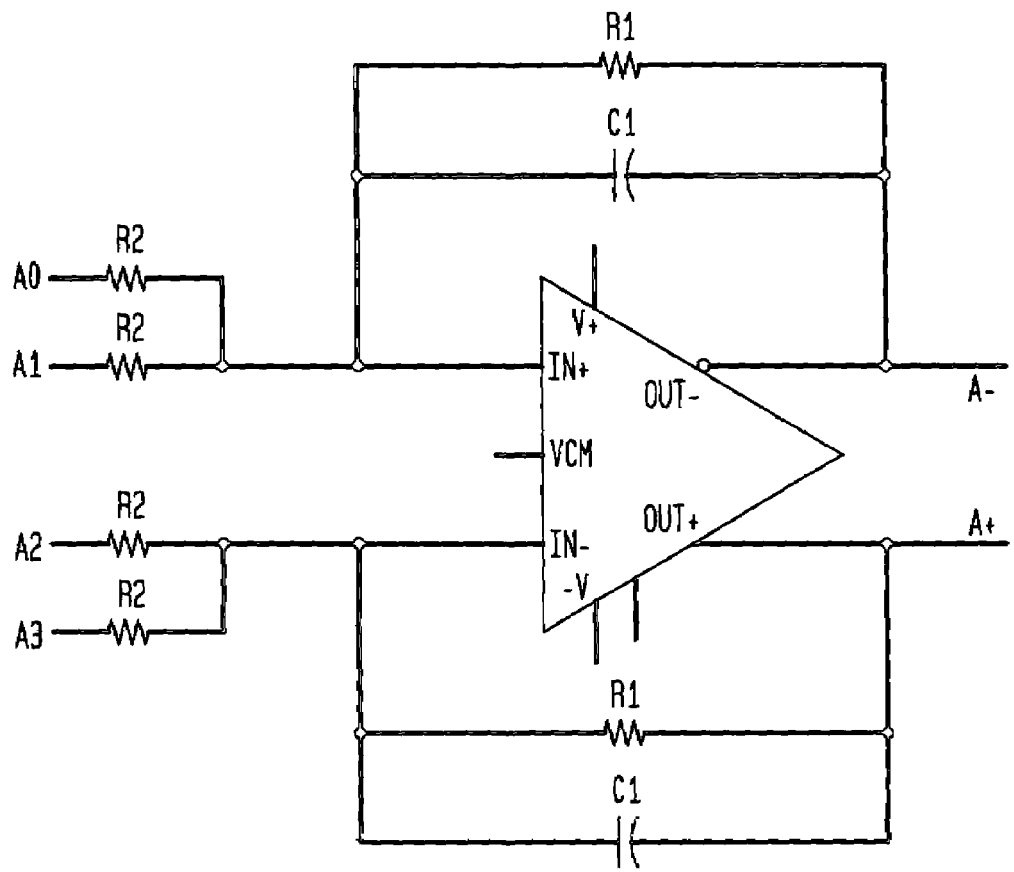
FIG. 6 shows an embodiment of a polarity transforming multiplexing circuit using a differential amplifier.

FIG. 6 shows one embodiment of a polarity inverting multiplexing circuit using differential amplifiers. Looking at FIG. 1, for block 110, 120, 130, and 140, possible polarity arrangements are:

$$A=(A^+-A^-)=(-A_0)+(-A_1)+(+A_2)+(+A_3) \quad (7)$$

$$B=(B^+-B^-)=(-B_0)+(+B_1)+(-B_2)+(+B_3) \quad (8)$$

$$C=(C^+-C^-)=(-C_0)+(-C_1)+(+C_2)+(+C_3) \quad (9)$$

$$D=(D^+-D^-)=(-D_0)+(+D_1)+(-D_2)+(+D_3) \quad (10)$$

A, B, C, and D from equations 7-10 may be converted from unipolar pulses to bipolar pulses, but the shape of the waveforms are fully maintained, so no timing and energy information is lost. The polarity combinations from A, B, C, and D may determine the gamma-ray incident block. The alternative "Anger Logic" is:

$$E=|A^+-A^-|+|B^+-B^-|+|C^+-C^-|+|D^+-D^-| \quad (11)$$

$$X=(|A^+-A^-|+|B^+-B^-|)/E \quad (12)$$

$$Y=(|A^+-A^-|+|C^+-C^-|)/E \quad (13)$$

Figure 7:
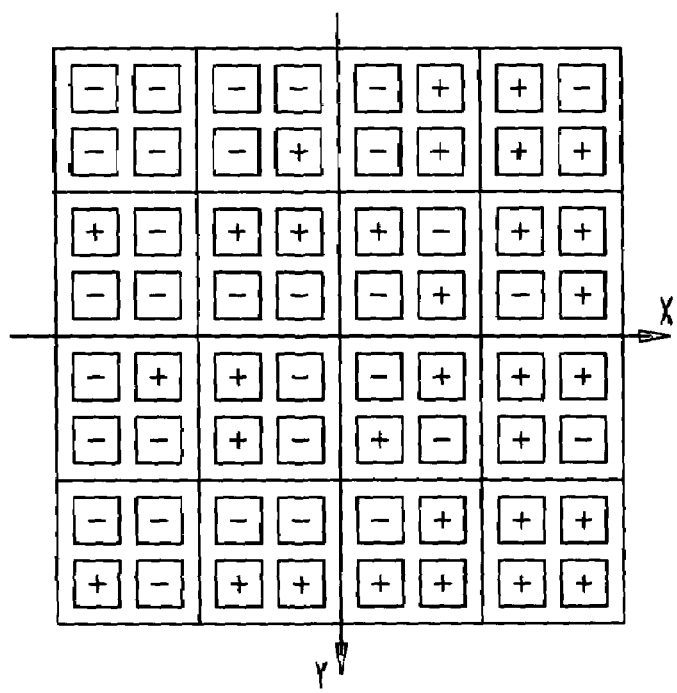
FIG. 7 shows a polarity configuration for a 16-block array in accordance with the invention.

One embodiment of a polarity configuration for a 16-block array is shown in FIG. 7. In this plot, a total of 64 processing channels can be reduced to 4 by using the multiplexing scheme.

Looking at FIG. 6, a differential amplifier may be used to invert signal polarity. When using an amplifier, electronic noise from the amplifier will be added to the signal channel. In order to obtain better timing information from the pulses, high-bandwidth, fast slew-rate, and low noise differential amplifiers may be used.

Figure 8:
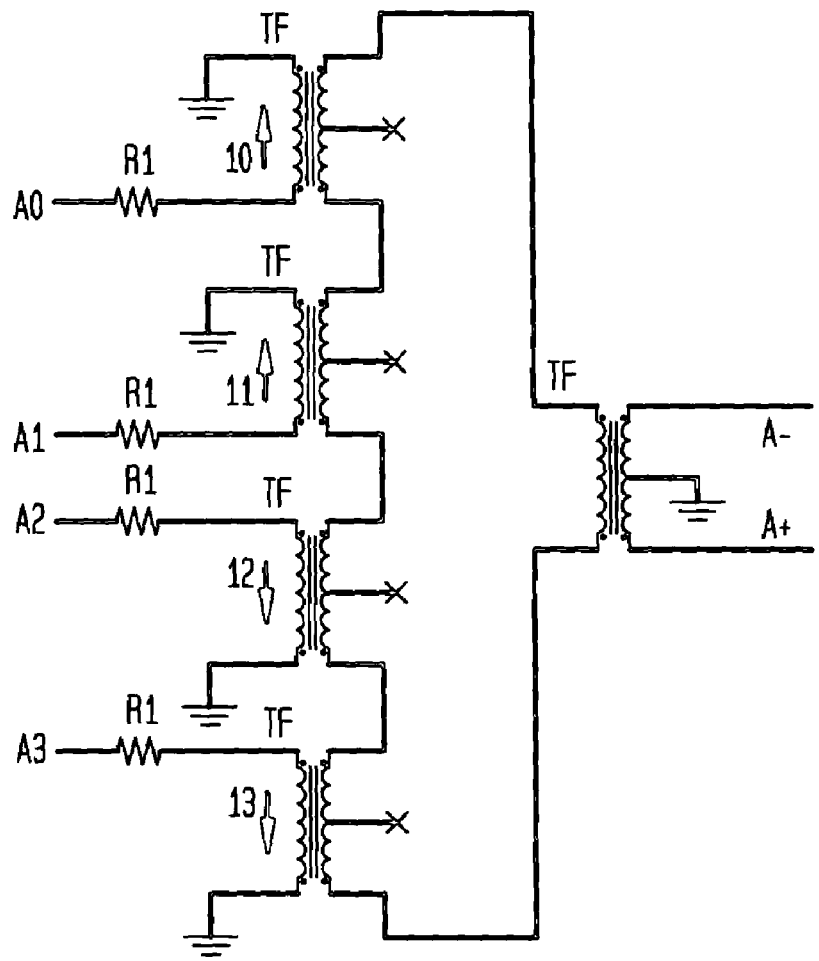
FIG. 8 shows an embodiment of a multiplexing circuit in accordance with the invention, using RF transformers.
Figure 9:
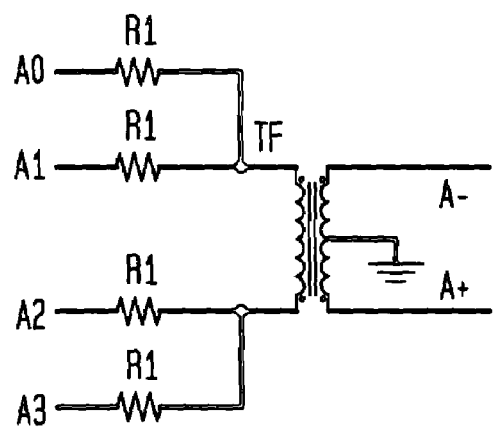
FIG. 9 shows a second embodiment of a multiplexing circuit in accordance with the invention.

Radio Frequency (RF) transformers may be implemented in an alternative embodiment of the invention. RF transformers, like the ADT1 series from Mini-Circuits, have sufficient bandwidth and transient response to handle PET scintillation signals. RF transformer coupled multiplexing circuit embodiments for APD detector electronics are shown in FIGS. 8 and 9. With these schemes, four channel single-ended signals from four different blocks may be coupled and summed together, then coupled to one differential output.

As shown in FIG. 8, by connecting the signals to a RF transformer at different ends, the current direction in the transformer loop may be reversed. For example, the signals from A0 and A3 may create currents of opposite direction in the loop, creating opposite polarities in the transformer outputs. This setup may function properly for both voltage and current sources.

FIG. 9 illustrates another embodiment of a circuit using RF transformers that is more compact. The numbers of transformers shown in this setup are reduced from 5 to 1. This circuit works well with voltage sources.

Even though the differential outputs (A+, A−) refer to ground in the circuits of FIGS. 8 and 9, they can be biased to other values, such as at +2.5V in a single +5V power system. The fully differential output may be coupled directly to fast sampling ADCs, or may drive twisted-pair cables in remote access systems.

In general, RF transformers are low cost compared to fast differential amplifiers, and they do not add noise to the system Conventionally, four signals A, B, C, and D in equations 4-6 are transferred from the PET detector to the main processing circuits. Since A, B, C, and D are all unipolar pulses in the detector, calculation (6) can be easily done by an operational amplifier. Unless a "digital CFD" method is implemented the signal E may need to be processed by analog circuits for detector timing.

By applying the RF transformer coupled multiplexing circuits of the invention, total energy E may be generated from equation 11. One possible solution with an analog circuit is to use the "absolute value" circuit. Since the E signal determines detector timing, the circuit may add noise to the E channel, potentially degrading crucial PET timing.

In equations 4-5, E (total energy) is shown rather than D (partial energy). The energy information of D is included in E. Sending A, B, C, and E from a PET detector may be equivalent to sending A, B, C, and D. Compared with A, B, and C in equations 7-9, E may maintain the unipolar property. This setup may facilitate analog CFD timing processes in the main electronics.

Figure 10:
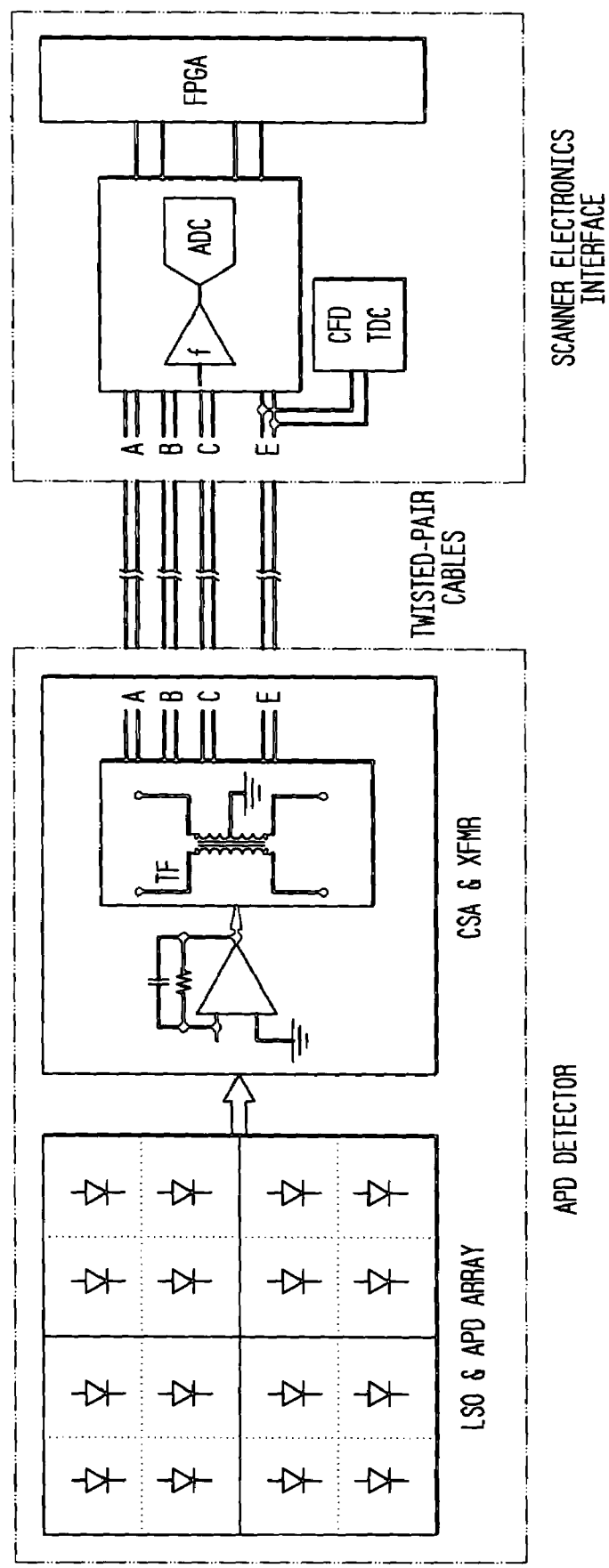
FIG. 10 shows a readout scheme for a four block detector in accordance with the invention.

FIG. 10 shows an embodiment of a readout configuration. A bipolar pulse of A, B, and C and a unipolar signal of E may be transferred from the detector to the main electronics. The E channel may be split into two; one may be used for detector timing (analog process), and the other, combined with A, B and C, may be sent to ADC for event positioning (digital process). The position calculations from equations 11-13 may be performed digitally in FPGA, and no further analog circuits would be needed.

The invention having been thus described, it will be apparent to those skilled in the art that the same may be varied in many ways without departing from the spirit of the invention. Any and all such modifications are intended to be included in the scope of the following claims.

What is claimed is:

1. A multiplexing system for selectively combining detector signals from a nuclear medical scintillation detector, comprising:
    a detector module comprising four scintillator blocks, each scintillator block containing four photosensors arranged in a predefined pattern; and
    a multiplexing circuit coupled to photosensor outputs from each scintillator block, comprising:
        a plurality of inputs coupled to said photosensor outputs;
        a signal polarity inverter coupled to preselected ones of said plurality of inputs; and
        at least one differential output coupled to the signal polarity inverter, wherein the four photosensors outputting signals A, B, C and D and total energy of the output signals is determined by the equation: $E=|A^+-A^-|+|B^+-B^-|+|C^+-C^-|-|D^+-D^-|$.

2. The multiplexing system of claim 1, wherein said photosensors are arranged in a grid.

3. The multiplexing system of claim 1, wherein said photosensors comprise photodiodes.

4. The multiplexing system of claim 1, wherein said multiplexing circuit converts a unipolar pulse to a bipolar pulse.

5. The multiplexing system of claim 4, wherein said signal polarity inverter comprises a differential amplifier.

6. The multiplexing system of claim 5, wherein the differential amplifier is a high bandwidth, fast slew-rate, low noise differential amplifier.

7. The multiplexing system of claim 4, wherein said signal polarity inverter comprises a radio frequency transformer.

8. The multiplexing system of claim 7, wherein the inputs are voltage sources.

9. The multiplexing system of claim 7, wherein the inputs are current sources.

10. A method of calculating the position of a scintillation event in a scintillation detector, comprising the steps of:
    converting unipolar signals $A_i$, $B_i$, $C_i$ and $D_i$ from said scintillation detector to bipolar signals ±A, ±B, ±C, and ±D, respectively;
    selectively combining said bipolar signals into differential output signals;
    transferring the differential output signals to a processor, and
    calculating the energy E and position (X, Y) of the scintillation event from said differential output signals, wherein said scintillation detector comprises four scintillator blocks, each block being associated with four photosensors, wherein said calculating step is based on the following equations:

$$E=|A^+-A^-|+|B^+-B^-|+|C^+-C^-|+|D^+-D^-|$$

$$X=(|A^+-A^-|+|B^+-B^-|)/E$$

$$Y=(|A^+-A^-|+|C^+-C^-|)/E, \text{ where}$$

$$A=(A^+-A^-)=(-A_0)+(-A_1)+(+A_2)+(+A_3)$$

$$B=(B^+-B^-)=(-B_0)+(+B_1)+(+B_2)+(+B_3)$$

$$C=(C^+-C^-)=(-C_0)+(-C_1)+(+C_2)+(+C_3)$$

$$D=(D^+-D^-)=(-D_0)+(-D_1)+(+D_2)+(+D_3).$$

11. The method of claim 10, wherein said step of converting is accomplished by a differential amplifier.

12. The method of claim 10, wherein said step of converting is accomplished by a radio frequency transformer.

13. The method of claim 10, wherein said photosensors comprise Avalanche Photodiodes (APOs).

14. The method claim 10 wherein said scintillator blocks comprise LSO crystals.

* * * * *